United States Patent
Lapidous et al.

(10) Patent No.: US 6,677,945 B2
(45) Date of Patent: Jan. 13, 2004

(54) MULTI-RESOLUTION DEPTH BUFFER

(75) Inventors: Eugene Lapidous, Santa Clara, CA (US); Guofang Jiao, San Jose, CA (US); Jianbo Zhang, Mountain View, CA (US)

(73) Assignee: XGI Cayman, Ltd. (KY)

( * ) Notice: Subject to any disclaimer, the term of this patent is extended or adjusted under 35 U.S.C. 154(b) by 384 days.

(21) Appl. No.: 09/839,247

(22) Filed: Apr. 20, 2001

(65) Prior Publication Data

US 2002/0180731 A1 Dec. 5, 2002

(51) Int. Cl.[7] .............................................. G06T 15/40
(52) U.S. Cl. ...................................... 345/422; 345/419
(58) Field of Search ................................ 345/422, 419; 434/29, 62, 69

(56) References Cited

U.S. PATENT DOCUMENTS

| | | |
|---|---|---|
| 4,961,153 A | 10/1990 | Fredrickson et al. |
| 5,301,263 A | 4/1994 | Dowdell |
| 5,579,455 A | 11/1996 | Greene et al. |
| 5,771,046 A | 6/1998 | Izawa et al. |
| 5,808,618 A | 9/1998 | Kawano et al. |
| 5,844,571 A | 12/1998 | Narayanaswami |
| 5,856,829 A | 1/1999 | Gray, III et al. |
| 5,977,980 A | 11/1999 | Aleksicy |
| 5,982,373 A | 11/1999 | Inman et al. |
| 6,046,746 A | 4/2000 | Deering |
| 6,354,838 B1 * | 3/2002 | Tagge et al. .................. 434/62 |

OTHER PUBLICATIONS

Eugene Lapidous and Guofang Jiao; Optimal depth buffer for low–cost graphics hardware; *Proceedings of the 1999 Eurographics/SIGGRAPH workshop on Graphics hardware*, 1999, pp. 67–73.

Eugene Lapidous and Guofang Jiao; Quasi–linear Z buffer; *Proceedings of the conference on SIGGRAPH 99: conference abstracts and applications*, 1999, p. 268.

* cited by examiner

*Primary Examiner*—Mark Zimmerman
*Assistant Examiner*—Lance W. Sealey
(74) *Attorney, Agent, or Firm*—David L. Alberrt; Gray Cary Ware & Freidenrich LLP

(57) ABSTRACT

The present invention provides a system and method for eliminating hidden surfaces in 3D graphics that improves rendering performance by decreasing the size of the data stored to or retrieved from the depth buffer when the distance from the camera to the pixel on the surface of the primitive is further than the threshold distance. The threshold distance from the camera is defined such that for such pixels the precision of a linear or quazi-linear depth buffer with a decreased data size is the same as or higher than the precision of a non-linear depth buffer with an original data size. The invention improves the usefulness of linear and quasi-linear depth buffers for 3D applications optimized for non-linear depth buffers. The present invention additionally affords a method for selecting the size of data to be read from the depth buffer before new depth values are computed for the same pixels.

29 Claims, 11 Drawing Sheets

MULTI-RESOLUTION DEPTH BUFFER

The present invention relates to computer graphics systems, and more specifically, to computer graphics systems that render primitives utilizing at least one frame buffer and depth buffer.

BACKGROUND OF THE INVENTION

Rendering of three-dimensional scenes requires a realistic representation of multiple objects in the field of view. Depending on the distance of each object from a given point of view (also known in 3D graphics as camera position), objects may occlude or be occluded by other objects. Even in the case of a single object, some of its parts may occlude or be occluded by other parts. Methods and apparatus used to resolve occlusions and eliminate hidden surfaces play an important role in creating realistic images of three-dimensional scenes.

To work effectively, methods of eliminating hidden surfaces have to utilize a depth resolution that is better than the minimal distance between the occluding object and the occluded object in the scene. Such methods also have to be simple enough to be implemented in low-cost graphics hardware that accelerates three-dimensional rendering, or in software-only rendering in cases where a hardware accelerator is not available.

Most popular algorithms for hidden surface elimination utilize depth buffers, or Z-buffers. Typically, a pixel represented on a screen at a two-dimensional location X,Y is also associated with a particular depth value, Z. This value is usually compared with a depth value stored in a special buffer at the location corresponding to the same X,Y coordinate set. Visibility tests compare new and stored depth values. If these tests pass, the depth value in the depth buffer can be updated accordingly.

Values of X,Y,Z are generally computed per each vertex of a triangle by transforming three-dimensional vertex coordinates from the view space (regular three-dimensional space with the origin of the coordinates aligned with the camera position) to the screen space (a three-dimensional space with the X,Y plane being parallel to the screen and distorted as a result of perspective projection). During this transformation the actual depth of the object in the camera field of view ($Z_v$) is mapped to the depth ($Z_s$) in the screen space. After values of $Z_s$ are computed for every vertex of the triangle they are linearly interpolated for every pixel during triangle rasterization. Interpolation results are compared with $Z_s$ values stored in the Z-buffer at corresponding locations to test visibility of the current pixel.

The most popular form of mapping between $Z_v$ and $Z_s$, which is supported by practically all hardware graphics accelerators, is known as "screen Z-buffer" and is described in detail by W. M. Newman and R. F. Sproull in *Principles of Interactive Computer Graphics*, published by McGraw-Hill in 1981 and incorporated herein by reference. Newman and Sproull describe the following definition for mapping between $Z_v$ and $Z_s$ as follows:

$$Z_s = \frac{Z_f}{Z_f - Z_n} * \left(1 - \frac{Z_n}{Z_v}\right)$$

where Zf and Zd are distances from the camera to the far (Zf) and near (Zn) clipping planes that bound the view volume in the screen space.

Non-linear mapping between $Z_v$ and $Z_s$ makes $Z_s$ less sensitive to changes in $Z_v$ that occur close to the far end of the view volume than to changes in $Z_v$ that occur close to the near end of the view volume. For example, in an instance where the ratio of distances to the far and near planes is equal to 100, a small change in $Z_v$ close to the near plane causes a larger change in $Z_s$, for example, by a factor of 10,000 or so, than the same amount of change in $Z_v$ close to the far plane. For example, a flight simulator application may have a range of visual distances from 0.1 mile for the closest point on the group or a plane in the same formation to a 1-mile distance to the mountains near the horizon. If the total resolution of the depth buffer is 16 bits (the $Z_s$ range from 0 to 65,325 ($2^{16}$)), changing $Z_s$ from zero to one (i.e., close to the camera) corresponds to changing the object's distance by 0.95 inches, while changing $Z_s$ from 65,324 to 65,325 (i.e., far from the camera) corresponds to changing the object's distance by 797 feet. If the total resolution of the depth buffer is 24 bits, changes in the object's distance close and far from the camera are decreased by a factor of 256. However, increasing the depth buffer from 16 to 24 bits increases memory bandwidth required for depth buffer access.

The bandwidth required to access external buffers that store color and depth values is a scarce resource, limiting the performance of modern 3D graphics accelerators. Usually, bandwidth consumed by a depth buffer is significantly larger than that consumed by the color buffer. For instance, if 50% of the pixels are rejected after a visibility test, the depth buffer may need three times more bandwidth than the color buffer. The depth values are read for all the pixels, and are written for 50% of the pixels, while the color values are only written for 50% of the pixels.

Several conventional approaches have been developed to reduce limits controlling the balance between the resolution of the depth buffer (i.e., 16-bit/24-bit) and rendering performance. In one approach, the mapping between the distance from the camera $Z_v$ and the stored depth values is modified to increase effective depth resolution. The use of a different mapping equation than that described above can be accompanied by the use of a different storage format. For example, a depth buffer having increased resolution (for example, a 1/W buffer) is described in U.S. Pat. No. 6,046,746, entitled "Method and Apparatus Implementing High Resolution Rendition of Z-buffered Primitives", and is incorporated herein by reference. Such a depth buffer stores values proportional to $1/Z_v$ in the floating-point format. Another type of depth buffer (a complementary Z-buffer) is described in a paper written by E. Lapidous and G. Jiao, entitled "Quasi Linear Z-buffer", published in 1999 in the Proceedings on the Conference of SIGGRAPH 99, and incorporated herein by reference. The complementary Z-buffer further increases depth buffer resolution for objects positioned far from the camera by storing values equivalent to $1-Z_s$ in floating-point format. Yet another type of depth buffer (a W-buffer) is used by Microsoft Corporation as a reference for measuring quality of 3D graphics accelerators, and stores values proportional to $Z_v$ providing a constant depth precision across the view volume.

The utility of these depth buffers in 3D software applications is limited in that such depth buffers are optional components and may not be supported by the widely available graphics hardware. Developers desiring maximum exposure of their product(s) typically design 3D applications so that they can be rendered correctly using a de-facto standard supported by almost all 3D graphics accelerators, which to date is a 24-bit screen Z-buffer conforming with equation (1) above. Even if a different type of depth buffer is supported by a particular 3D hardware accelerator, the lack of applications that exploit improved precision limit the usefulness of this feature. Further, the use of the W-buffer as a reference also limits development of depth buffers having increased precision, since depth buffers with an increased precision compared with the W-buffer may produce a different image, and be treated as an error by the quality control software. Thus, 3D applications are designed to correctly render images using either the 24-bit W-buffer or the 24-bit screen Z-buffer, limiting the minimally required depth precision in each point of view volume to the least of the two precision values available at that point.

In another approach, data exchange used during access to the depth buffer is modified to decrease the required bandwidth. For instance, U.S. Pat. No. 5,844,571, entitled "Z-buffer Bandwidth Reductions Via Split Transactions", which is incorporated herein by reference, describes Z-buffer bandwidth reductions via split transactions, where the least significant bits of a value in the depth buffer are read only if reading the most significant bits of the value is not enough to resolve visibility. This solution decreases the bandwidth required to read depth values, however, the bandwidth required to write depth values for pixels that pass visibility tests remains unchanged. If the latency associated with reading the depth values is large, multiple accesses to a stored depth value during a visibility test on the same pixel may decrease performance even during read operations, or require expensive measures to compensate doubled access latency. This problem is exacerbated by the fact that the request to read the least significant bits of a depth value can be issued only after a new depth value is computed and compared with the old most significant bits of the depth value. The next read request for the same pixel is delayed by a combination of the latency of the first read and of the time required to compute a new depth value.

SUMMARY OF THE INVENTION

The present invention provides a system and method for eliminating hidden surfaces in 3D graphics that improves rendering performance by decreasing the size of the data stored to or retrieved from the depth buffer when the distance from the camera to the pixel on the surface of a primitive is further than a threshold distance. The threshold distance from the camera is defined such that for such pixels the precision of a linear or quasi-linear depth buffer with a decreased data size is the same as or higher than the precision of a non-linear depth buffer with an original data size. The invention also improves the usefulness of linear and quasi-linear depth buffers for 3D applications that are optimized for non-linear depth buffers. The present invention also affords a method for selecting the size of the data to be read from the depth buffer before new depth values are computed for the same pixels.

In an aspect, the invention affords a method for identifying whether a given primitive is visible by a camera in a view volume at a pixel P corresponding to an area on the surface of a given primitive. The method comprises the steps of: storing a first depth value that is associated with the pixel P in a buffer, the first depth value including a first portion including the most significant bits of the first depth value and a second portion including the least significant bits of the first depth value; computing a second depth value that is associated with the pixel P, the second depth value including a third portion including the most significant bits of the second depth value and a fourth portion including the least significant bits of the second depth value; comparing the second depth value with a value corresponding to the threshold distance from the camera; retrieving at least the most significant bits of the first depth value; comparing the retrieved bits with the second depth value to determine if the pixel P is visible; and if the pixel P is visible and is closer to the camera than the threshold distance, replacing the first depth value with the second depth value; if the pixel P is visible and is further from the camera than the threshold distance, replacing the first portion of the first depth value with the third portion of the second depth value while leaving the second portion of the first depth value unchanged.

If the pixel P is closer to the camera than the threshold distance, the step of retrieving includes retrieving the first and second portions of the first depth value, and if the pixel P is further from the camera than the threshold distance, the step of retrieving includes retrieving only the first portion of the first depth value. If the pixel P is closer to the camera than the threshold distance, the second portion of the first depth value is retrieved before comparing the retrieved bits with the second depth value.

The second depth value is computed in accordance with a function of the distance from a camera Zv and the second depth value is stored in accordance with a predefined storage format. The threshold distance from the camera Zt is at a distance to a plane in the view volume located between near and far planes at corresponding distances Zn and Zf. For a pixel P further from the camera than the threshold distance, the error in defining Zv while using the third portion of the second depth value is equal to or less than the error in defining Zv while using the third and fourth portions of the second depth value if the second depth value is computed using the function $Z=Zf/(Zf-Zn)*(1-Zn/Zv)$. The second depth value is scaled by a bit size corresponding to a maximum bit size that can be stored in the buffer. The second depth value is preferably stored in the buffer in an integer format.

The predefined storage format is preferably a floating-point format including an exponent and a mantissa, where the first portion of the second depth value includes the exponent and a fifth portion corresponding to the most significant bits of the mantissa, and where the second portion of the second depth value includes a sixth portion corresponding to the least significant bits of the mantissa.

For a pixel P further from the camera than a threshold distance, the error in defining Zv at any distance of the view volume using the third and fourth portions of the second depth value is less than or equal to the maximum of the error in defining Zv using the third and fourth portions of the second depth value calculated in accordance with either the function $Z=Zf/(Zf-Zn)*(1-Zn/Zv)$ or the function $Z=Zv/Zf$.

In another aspect, the invention affords an alternative method for identifying whether a given primitive is visible by a camera in a view volume at a pixel P corresponding to an area on the surface of a given primitive. The method comprises the steps of: storing a first depth value that is associated with the pixel P in a buffer, the first depth value including a first portion including the most significant bits of the first depth value and a second portion including the least significant bits of the first depth value; retrieving a first set of bits corresponding to the first portion of the first depth value; comparing the retrieved first set of bits with a value corresponding to a threshold distance from the camera; computing a second depth value that is associated with the pixel P, the second depth value including a third portion including the most significant bits of the second depth value and a fourth portion including the least significant bits of the second depth value; and if the retrieved first set of bits correspond to a distance to the camera closer than the threshold distance, retrieving a second set of bits corresponding to the second portion of the first depth value and comparing the second depth value with the first depth value to determine if the pixel P is visible; if the retrieved first set of bits correspond to a distance to the camera that is further than the threshold distance, comparing the second depth value with the first portion of the first depth value to determine if the pixel P is visible; and if the pixel P is visible, replacing the first depth value with the second depth value in the buffer.

If the first set of retrieved bits correspond to a distance to the camera that is closer than the threshold distance, the step of replacing the first depth value with the second depth value includes replacing the first depth value with the second depth value. If the first set of retrieved bits correspond to a distance to the camera that is further than the threshold distance, the step of replacing the first depth value with the second depth value includes replacing only the first portion of the first depth value with the third portion of the second depth value. The second depth value is computed in accordance with a function of the distance from a camera Zv and is stored in accordance with a predefined storage format, where the threshold distance from the camera Zt is a distance to a plane in the view volume that is located between near and far planes at corresponding distances Zn and Zf.

For a pixel P that is further from the camera than a threshold distance, the error in defining Zv while using the third portion of the second depth value is equal to or less than the error in defining Zv while using the third and fourth portions of the second depth value if the second depth value is computed using the function Z=Zf/(Zf−Zn)*(1−Zn/Zv). The function is a linear dependency between the second depth value and the distance to the camera. Preferably, the second depth value is stored in the buffer in an integer format.

The predefined storage format is preferably a floating-point format including an exponent and a mantissa, and wherein the first portion of the second depth value includes the exponent and a fifth portion corresponding to the most significant bits of the mantissa, and wherein the second portion of the second depth value includes a sixth portion corresponding to the least significant bits of the mantissa.

In another aspect, the invention provides an apparatus for evaluating the depth of a pixel P in a scene, the scene being enclosed in a view volume defined by a near and a far plane, and rendered from a camera position. The apparatus comprises a depth value calculation module configured to calculate a depth value for a pixel in the scene, the depth value being generated in accordance with a depth function of view distance within the view volume from the camera position, a depth storage module configured to store the depth value in a depth value storage buffer, the depth value having a first portion corresponding to the most significant bits of the depth value and a second portion corresponding to the least significant bits of the depth value, a comparator that compares the calculated depth value with a value corresponding to a threshold distance from the camera, a visibility testing module that compares the calculated depth value with a depth value fetched from the depth buffer to determine if the pixel P is visible, and a decision logic module that, based on the comparison performed by the first comparator, causes the depth storage module to perform one of the functions of: storing the calculated depth value in the buffer if the pixel P is closer to the camera than the threshold distance, or storing only the first portion of the calculated depth value in the buffer if the pixel P is further from the camera than the threshold distance.

The decision logic module causes the depth storage module to perform one of the additional functions: fetching the depth value from the depth buffer prior to sending it to the visibility testing module if the pixel P is closer to the camera than the threshold distance, or fetching only the first portion of the depth value from the depth buffer prior to sending it to the visibility testing module if the pixel P is further from the camera than the threshold distance.

The threshold distance from the camera Zt is a distance to a plane in the view volume that is located between near and far planes at corresponding distances Zn and Zf, and for any pixel P that is further from the camera than the threshold distance, the error in defining Zv while using the first portion of the depth value computed using the depth value calculation module and stored using a storage format of the depth storage module is equal to or less than the error in defining Zv while using the first and second portions of the depth value if the depth value is computed using the function Z=Zf/(Zf−Zn)*(1−Zn/Zv). The depth storage module is configured to store depth values in an integer format, and the depth evaluation module utilizes a depth function in accordance with a linear dependency between a stored depth value and the distance to the camera.

The predefined storage format is preferably a floating-point format including an exponent and a mantissa, and wherein the first portion of the depth value includes the exponent and a third portion corresponding to the most significant bits of the mantissa, and wherein the second portion of the depth value includes a fourth portion corresponding to the least significant bits of the mantissa. The size of the first portion of the depth value is preferably 16 bits, and the size of the second portion of the depth value is preferably 8 bits. The comparator is configured to compare the calculated depth value with the value corresponding to the threshold distance to the camera only if the ratio of the distances to the far and near planes Zf/Zn is larger than a predetermined value that is preferably greater than or equal to 100.

DETAILED DESCRIPTION OF THE PREFERRED EMBODIMENT

Figure 1A:
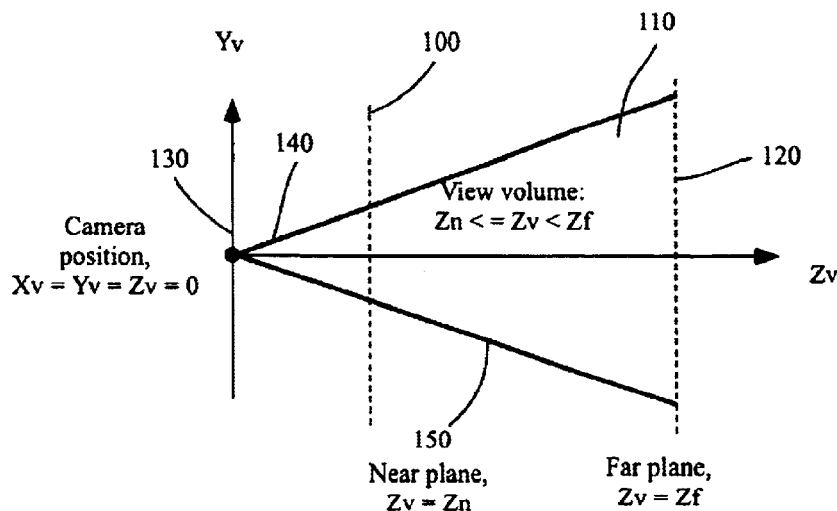
FIG. 1A is a diagram illustrating a geometry of a scene rendered in three-dimensional space with a camera positioned at the coordinate origin.

FIG. 1A is a diagram illustrating a geometry of a scene rendered in three-dimensional space with a camera positioned at the coordinate origin. This space is known as the view space. Elements of the scene are rendered if they are located inside the view volume 110. The view volume 110 shown in FIG. 1A has a pyramidal shape bound by six planes. Four sides of the pyramid intersect at the common point of the camera location 130, and two planes bound distances from the camera (near plane 100 and far plane 120). In FIG. 1A two of the side planes 140, 150 are projected as solid lines with respect to the plane Y-Z.

Figure 1B:
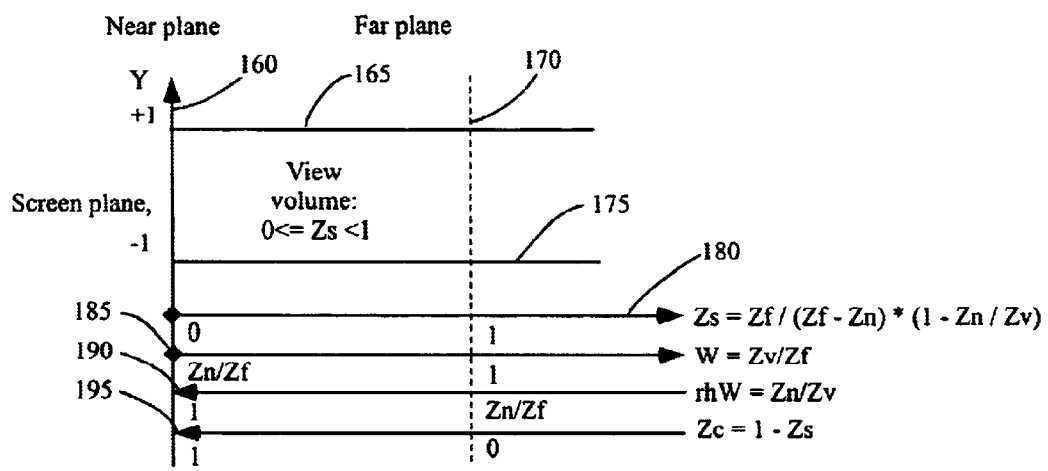
FIG. 1B demonstrates four types of mapping functions for mapping depth values in the view space and in the screen space.

To render a scene from the camera viewpoint 130, all of the coordinates in the view volume are transformed into the screen space, which is shown in FIG. 1B, preferably using a projection transformation matrix, as is described in the Newman and Sproull reference discussed above. However, other projection transformation methods may be used without departing from the invention. As a result of the transformation, the view volume is transformed into a normalized cube, with one of the planes in the Z-direction aligned with screen plane 160 (Z=0) and another plane 170 parallel to the screen plane 160. This space is known as the screen space.

FIG. 1B demonstrates four types of mapping functions for mapping depth values in the view space and in the screen space. One type of depth buffer, known as a "screen Z-buffer", uses the following mapping function to calculate transformation:

$$Z_x = \frac{Z_f}{Z_f - Z_n} * \left(1 - \frac{Z_n}{Z_v}\right)$$

The best depth resolution for the screen Z-buffer is achieved when each distance from the camera in the view volume $[Z_n, Z_f]$ is mapped to a screen space depth value 180 in the range $[0,1]$ (scaled to the maximum value that can be stored using a given number of bits) and stored as an integer. The combination of the above equation with integer storage of the depth value is a common technique in modern computer graphics, and represents the de-facto standard for depth buffers supported by 3D graphics accelerators.

Another type of depth buffer, a "W-buffer" uses a linear mapping function for mapping depth values in the view volume and the screen space. The linear mapping function is reproduced below.

$$Z_s = \frac{Z_v}{Z_f}$$

The best resolution for a W-buffer is achieved when each distance from the camera in the view volume $[Z_n, Z_f]$ is mapped to a screen space depth value 185 in the range $[Z_n/Z_f, 1]$ (scaled to the maximum value that can be stored with a given number of bits), and stored as an integer. A W-buffer is known to have better depth precision (at the same storage size) that the screen Z-buffer since its depth precision remains constant for any point in the view volume. The W-buffer is used as a precision benchmark in quality assurance tests developed by Microsoft Corporation. The W-buffer, however, is more difficult to implement in hardware than the screen Z-buffer due to the need to perform additional division operations for every pixel.

Another type of depth buffer, an "inverse Z-buffer" or "rh W-buffer", uses an inverse linear mapping function for mapping depth values in the view volume and screen space. The inverse linear mapping function is reproduced below.

$$Z_s = \frac{Z_n}{Z_v}$$

As described in U.S. Pat. Nos. 5,856,829 and 6,046,746, respectively entitled "Inverse Z-buffer and Video Display System Having List-based Control Mechanism for Time-deferred Instructing of 3D Rendering Engine That Also Responds To Supervisory Immediate Commands", and "Method and Apparatus Implementing High Resolution Rendition of Z-buffered Primitives", both which are incorporated herein by reference, the best depth resolution for the rh W-buffer is achieved when each distance from the camera in the view volume $[Z_n, Z_f]$ is mapped to a screen space depth value 190 in the range $[1, Z_n/Z_f]$ (scaled to the maximum value that can be stored with a given number of bits), and stored as a floating-point number. The rh W-buffer is known to have better depth precision at the same storage size than the screen Z-buffer. Also, the rh W-buffer is simpler to implement in hardware graphics accelerators than the W-buffer. Some 3D graphics accelerators available in the market, such as the GeForce family of graphics accelerators from n Vidia Corporation and the Voodoo family of graphics accelerators from 3dfx Corporation, provide support for the rh W-buffer in addition to the screen Z-buffer.

Another type of depth buffer that provides better resolution than the screen Z-buffer is a "complementary Z-buffer". The complementary Z-buffer uses a mapping function that is complementary to the function used by the Z-buffer. That mapping function is reproduced below.

$$Z_c = 1 - Z_s = \frac{Z_n}{Z_f - Z_n} * \left(\frac{Z_f}{Z_v} - 1\right)$$

As described in the paper by E. Lapidous et al. referenced above, the best depth resolution for a complementary Z-buffer is achieved when each distance from the camera in the view volume $[Z_n, Z_f]$ is mapped to a screen space depth value 195 in the range $[1,0]$ (scaled to the maximum value that can be stored with a given number of bits) and stored as a floating point number. Due to the floating point storage format, complementary Z-buffers may have better precision in areas closer to the far plane 120 of the view volume than other known depth buffers of the same storage size. While the W-buffer, inverse W-buffer, and complementary Z-buffer all have better depth precision at the same storage size than the screen Z-buffer, their practical advantages in conventional implementations are limited by the fact that a majority of 3D applications limit the required depth precision to the minimal de-facto standard of the screen Z-buffer.

To better understand the present invention, first a description of how depth precision for a given distance from the camera is computed will be presented. Each value $Z_d$ stored in a depth buffer has an associated error $dZ_d(Z_d)$ which is a known function of its storage format. This error corresponds to the change of the stored depth value when the least significant storage bit changes by 1. For instance, a floating point error value $dZ_d$ decreases with a decrease in $Z_d$ because the same change in the mantissa is scaled by a smaller exponent. An integer error value $dZ_d$ remains constant with a change in $Z_d$. For a known mapping function $Z_v(Z_d)$ between the distance from the camera $Z_v$ and the depth value in screen space $Z_d$, the depth error $dZ_d$ is mapped to the error of the distance from the camera $\delta Z_v$ and the effective resolution of the depth storage P using the equations presented below.

$$\delta Z_v(Z_v) = |Z_v(Z_d + dZ_d(Z_d)) - Z_v(Z_d)|$$

$$P = log2(Z_v/\delta Z_v)$$

Figure 2:
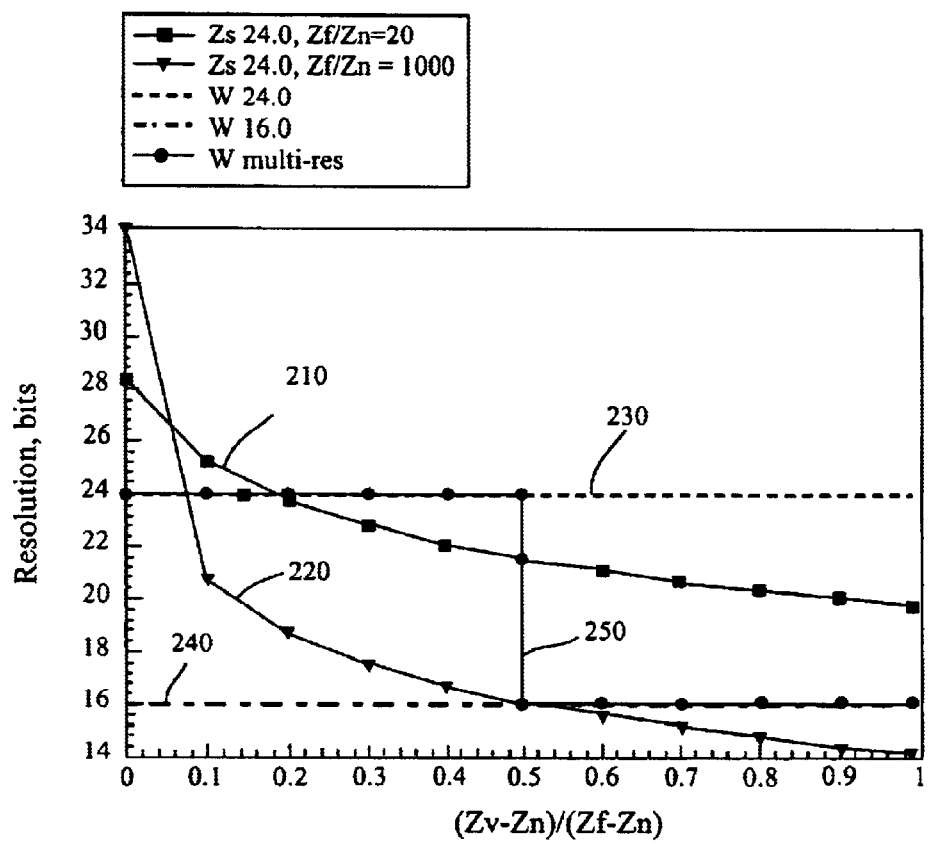
FIG. 2 shows a relationship between resolution of the depth buffer and distance from the camera, normalized to the range [0,1], for two types of integer depth buffers and two ratios $Z_f/Z_n$, (far/near) affecting the mapping function $Z_v(Z_s)$.

FIG. 2 shows a relationship between resolution of the depth buffer and distance from the camera, normalized to the range [0,1] for two types of integer depth buffers and two ratios $Z_f/Z_n$ (far/near) affecting the mapping function $Z_v(Z_d)$. Data set 210 represents the precision of the screen Z-buffer stored using 24 bits per pixel at $Z_f/Z_n=20$. Data set 220 represents the precision of a 24-bit screen Z-buffer at $Z_f/Z_n=1,000$. Data sets 230, 240 represent the precision of the W-buffer stored using 24 bits per pixel (data set 230) and 16 bits per pixel (data set 240). Because the mapping function for the W-buffer is linear, its precision is generally independent of the distance from the camera and of the ratio $Z_f/Z_n$. As FIG. 2 demonstrates, for $Z_f/Z_n=1,000$, the precision of the 24-bit screen Z-buffer becomes smaller than the precision of the 16-bit W-buffer at large distances from the camera. At the same time, for smaller distances to the camera, the precision of the 24-bit screen Z-buffer exceeds the precision of the 16-bit W-buffer. Regions where the precision of the 24-bit screen Z-buffer is less than that of the 16-bit buffer exist only if the ratio of $Z_f/Z_n$ is large. As shown in FIG. 2, at $Z_f/Z_n=20$, the precision of the 24-bit screen Z-buffer exceeds the precision of the 16-bit W-buffer in the entire range of depth values inside the view volume.

FIG. 2 demonstrates that there is a threshold distance from the camera $Z_t$ for at least one value in the ratio $Z_f/Z_n$ such that for distances larger than $Z_t$, the precision of the screen Z-buffer become less than the precision of another depth buffer (such as a W-buffer for example). The present invention results in decreasing the bandwidth utilized for visibility testing by using a depth buffer that, for a particular depth range, has the same or better precision than the conventional screen Z-buffer while storing depth values of a smaller size, and by using different storage sizes for depth values inside and outside of this depth range.

In an embodiment of the invention, a new depth value may be computed for a given pixel and compared with a predetermined threshold (such as the value of W corresponding to the distance $Z_v$ from the camera position described by equations $(Z_v-Z_n)/(Z_f-Z_n)=0.5$, $Z_f/Z_n=1,000$, as shown in FIG. 2). If the new depth value is larger than this threshold, a 16-bit W-buffer value may be read from the depth buffer and compared with the 16 most significant bits of the new depth value. If the visibility test passes successfully, the 16 most significant bits of the depth value may be written to the depth buffer. Alternatively, if the new depth value is smaller than the threshold, a 24-bit W-buffer value may be read from the depth buffer and compared with the 24-bit new depth value. If the visibility test passes successfully, the 24-bit depth value may be written to the depth buffer.

The precision of the resulting multi-resolution W-buffer is represented by the curve 250 in FIG. 2. The curve 250 demonstrates that for any point in the view volume, the precision of the multi-resolution W-buffer is at least as good as the minimal precision of the 24-bit screen Z-buffer and 24-bit W-buffer. As discussed above, to be rendered correctly by a majority of hardware graphics accelerators, 3D applications do not use a depth precision that exceeds the minimal precision of the W-buffer and screen Z-buffer. Therefore, the present invention can be used by any 3D application that satisfies this criteria.

Conventional solutions, such as described in U.S. Pat. Nos. 5,301,263 and 5,844,571, respectively entitled "High Memory Bandwidth System For Updating Z-buffer Values" and "Z-buffer Bandwidth Reductions Via Split Transactions" are known to read different amounts of per-pixel data depending on the results of the visibility test. However, these solutions require that all data, including the most and least significant bits, be written for visible pixels, thereby always using the maximum depth buffer resolution (at least for the write transactions). The invention solves this limitation, in part by reducing the size of the per-pixel data during both read and write operations if the depth value is larger than a predefined threshold. Accordingly, the invention affords a multi-resolution buffer where entries in the depth buffer of different sizes can be arbitrarily mixed with each other without any additional flags indicating resolution changes. Each entry in the depth buffer may have a fixed size that is equal to the highest available resolution. However, the less significant bits of the depth values for some pixels may remain undefined for one or more frames that are not involved in either read or write transactions.

Another difference between the present invention and conventional buffers is that per-pixel determination of the size of the memory access may be computed before the visibility test instead of being done after the visibility test. This determination can be based on either the depth value computed for the given pixel, or on the value of the most significant bits of the depth value read for the given pixel from the buffer, but does not require both new and stored values to be available at the same time, although it may still perform if this is the case. Different embodiments of the invention may incorporate this aspect and will be discussed below.

Figure 3:
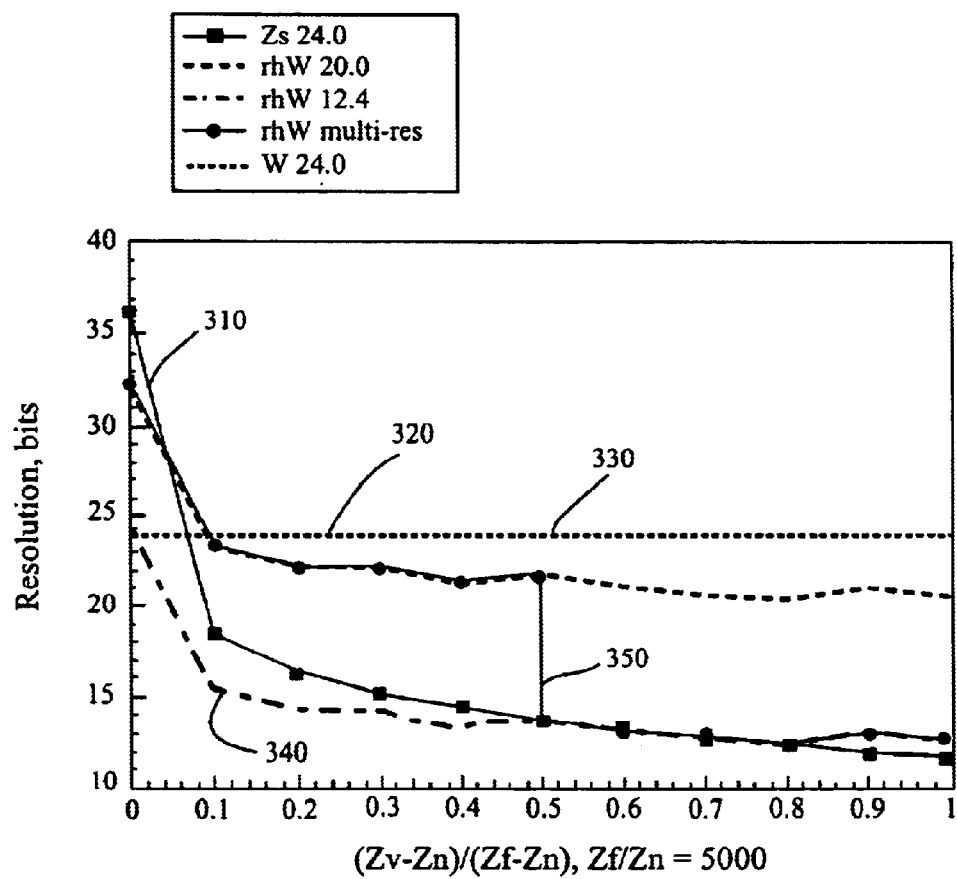
FIG. 3 shows the resolution resulting from using the invention with a floating point rh W-buffer when the ratio $Z_z/Z_f$ is equal to 5,000.

The present invention can be implemented using different types of depth buffers. FIG. 3 demonstrates an exemplary case which shows the resolution resulting from using the invention with a floating point rh W-buffer when the ratio $Z_f/Z_n$ is equal to 5,000. Data set 310 represents the precision of the 24-bit screen Z-buffer depth values stored as an integer. Data set 330 represents precision of the 24-bit rh W-buffer depth values stored as a floating point number with 20 bits of mantissa and 4 bits of exponent. The 16 most significant bits of the number include 4 bits of exponent and the 12 most significant bits of the mantissa. The remaining 8 bits are the least significant bits of the mantissa. Data set 340 represents the precision of the 16-bit rh W-buffer depth values stored as a floating point number with 4 bits of exponent and 12 bits of mantissa (the same as the 16 most significant bits of the 24-bit format for data set 330).

As shown in FIG. 3, at distances from the camera that exceed the threshold value derived from the equation $(Z_v-Z_n)/(Z_f-Z_n)=0.5$, the precision of the 24-bit screen Z-buffer becomes equal to or less than the precision of the 16-bit rh W-buffer. Line 320 indicates the precision of the 24-bit W-buffer. The precision of the multi-resolution rh W-buffer 350 always remains equal to or higher than the minimum of the precision of the 24-bit W-buffer and the 24-bit screen Z-buffer, thus satisfying the condition of acceptable depth precision discussed above.

Figure 4:
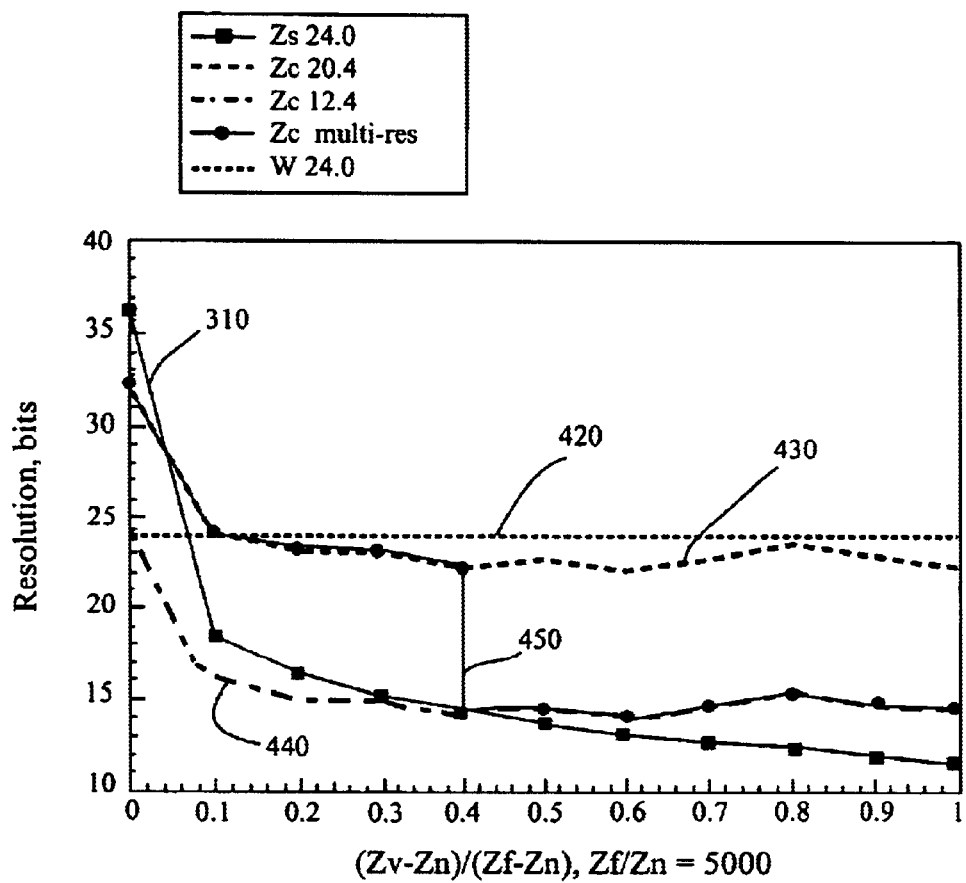
FIG. 4 shows the resolution resulting from using the invention with a floating point complementary Z-buffer.

FIG. 4 demonstrates an exemplary case which shows the resolution resulting from using the invention with a floating point complementary Z-buffer. Data set 410 represents the precision of the 24-bit screen Z-buffer. Data set 430 represents the precision of the 24-bit complementary Z-buffer with 20 bits of mantissa and 4 bits of exponent (the same as the 24-bit rh W-buffer shown in FIG. 3). Data set 440 represents the precision of the 16-bit complementary Z-buffer. As shown in FIG. 4, the range of distances where the precision of the 24-bit screen Z-buffer is equal to or less than the precision of the 16-bit complementary Z-buffer is larger than the range of such distances for the rh W-buffer at the same ratio $Z_f/Z_n=5,000$. This reflects a better precision using the complementary Z-buffer as compared with the rh W-buffer, thus making it more efficient in the framework of the present invention.

Figure 5:
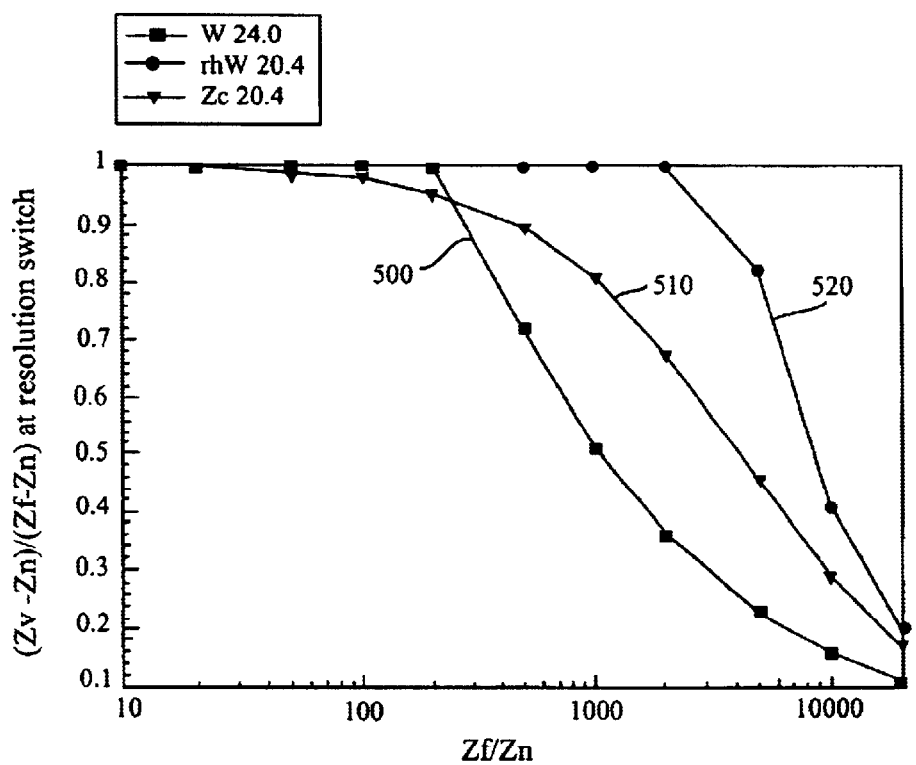
FIG. 5 illustrates how a depth value threshold is used to switch the resolution of the depth buffer of the invention depending on the ratio of the distances from the camera to the far and near planes in the view volume $Z_f/Z_n$.

FIG. 5 illustrates how a depth value threshold is used to switch the resolution of the depth buffer of the invention depending on the ratio of the distances from the camera to the far and near planes in the view volume $Z_f/Z_n$. Results are produced by computing the minimal distances from the camera when the precision of the corresponding 16-bit depth buffer (W-buffer for the set 510, complementary Z-buffer for the set 520, rh W-buffer for the set 530) becomes at least as good as the precision of the 24-bit screen Z-buffer. The data set 510 for the W-buffer demonstrates that such a threshold distance inside the view volume exists only for ratios $Z_f/Z_n$ that are larger than 200. The portion of the view volume that can be addressed using a 16-bit W-buffer increases (while the threshold distance moves closer to the near plane) with an increase in $Z_f/Z_n$.

It should be noted that even in the case where $Z_f/Z_n=20$, which is represented by data set 210 in FIG. 2, it is still possible to use the present invention if the most significant portion of the depth value is larger than 16 bits. For instance, if the most significant bits of the depth value stored in the W-buffer are the first 20 bits and the least significant bits are the remaining 4 bits, a switch between a 24-bit and a 20-bit W-buffer for $Z_f/Z_n=20$ may occur at $(Z_v-Z_n)/(Z_f-Z_n)=0.8$. In this case, less bandwidth is saved than by switching from the 24- to 16-bit data size. However, the resolution change in less than 8-bit increments can be more difficult to implement due to the byte-based memory alignment.

As shown in FIG. 5, the W-buffer provides a more efficient implementation of the present invention for most of the $Z_f/Z_n$ ratios than other depth buffer types. However, it is difficult to implement in graphics hardware. In contrast, implementing a complementary Z-buffer and rh W-buffer is relatively simple. The complementary Z-buffer provides a more efficient implementation of the current invention (lower depth threshold values) than the rh W-buffer at a similar level of complexity.

Computations used to render data sets such as shown in FIG. 5 can be performed by the graphics driver or by a 3D application before rendering a scene with known depth buffer types, sizes of pre-pixel depth values, sizes of its most significant bits, and with known values of the $Z_f/Z_n$ ratio. If the switch point is found in the view volume, where the precision of the full-resolution screen Z-buffer becomes equal to or less than the precision of the current depth buffer, then the present invention is useful in rendering the given scene. Although the present invention is useful in rendering other scenes as well. The multi-resolution depth buffer of the invention can be enabled or disabled by the application or graphics driver when the ratio $Z_f/Z_n$ changes. To simplify the computation on a pre-frame basis, the data sets determining the threshold distances for different $Z_f/Z_n$ ratios can be pre-computed and stored in look-up tables.

Figure 6:
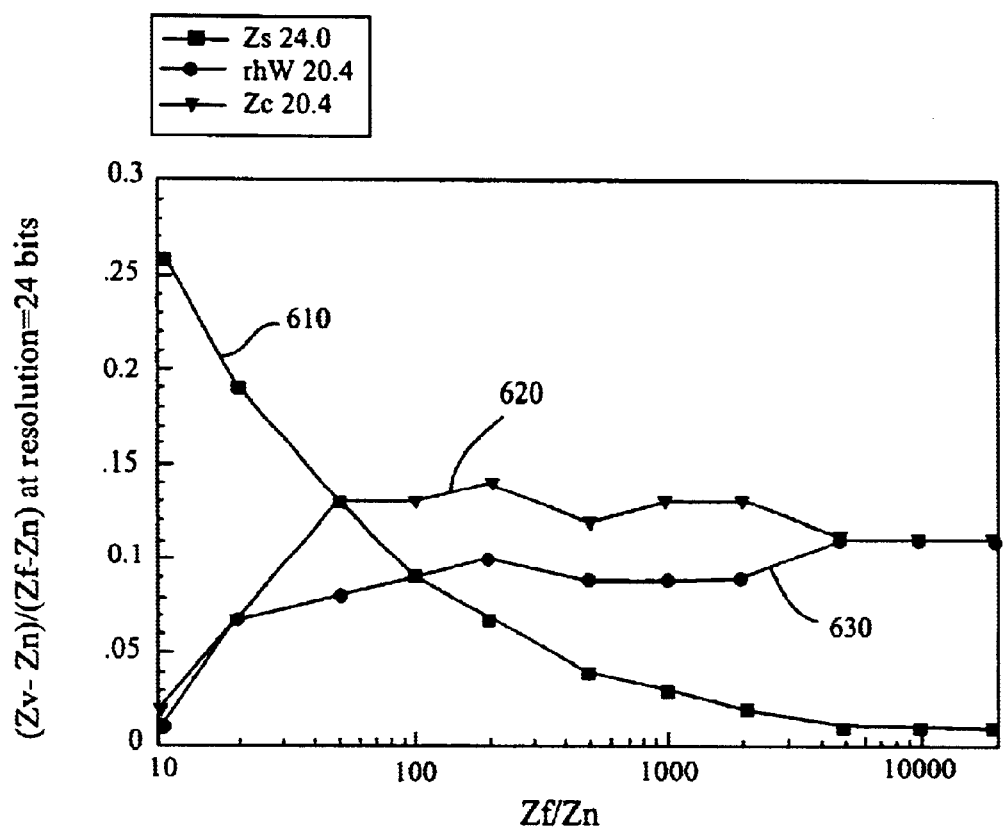
FIG. 6 illustrates various precision points for different ratios of $Z_f/Z_n$.

To insure that the multi-resolution buffer is an acceptable substitute for the conventional full-resolution Z-buffer, the precision of the multi-resolution depth buffer has to be at least as good as the minimum of the precision of either the screen Z-buffer or the W-buffer. FIG. 6 illustrates various precision points for different ratios of $Z_f/Z_n$. For a screen Z-buffer, which is represented by the data set 610, the distance where the precision drops below 24 bits decreases with an increase of $Z_f/Z_n$. Distances for the complementary Z-buffer (data set 620) and the rh W-buffer (data set 630) increase with an increase of $Z_f/Z_n$. As FIG. 6 indicates, at values of $Z_f/Z_n$ above 200 (where the multi-resolution depth buffer is most effective), the precision of both 24-bit complementary Z-buffer and the rh W-buffer remains higher than 24 bits at the distance when the precision of the 24-bit screen Z-buffer drops below this level. This indicates that when compared with the threshold distances indicated in FIG. 5, the multi-resolution depth buffer of the present invention is an acceptable replacement for the screen Z-buffer.

Figure 7:
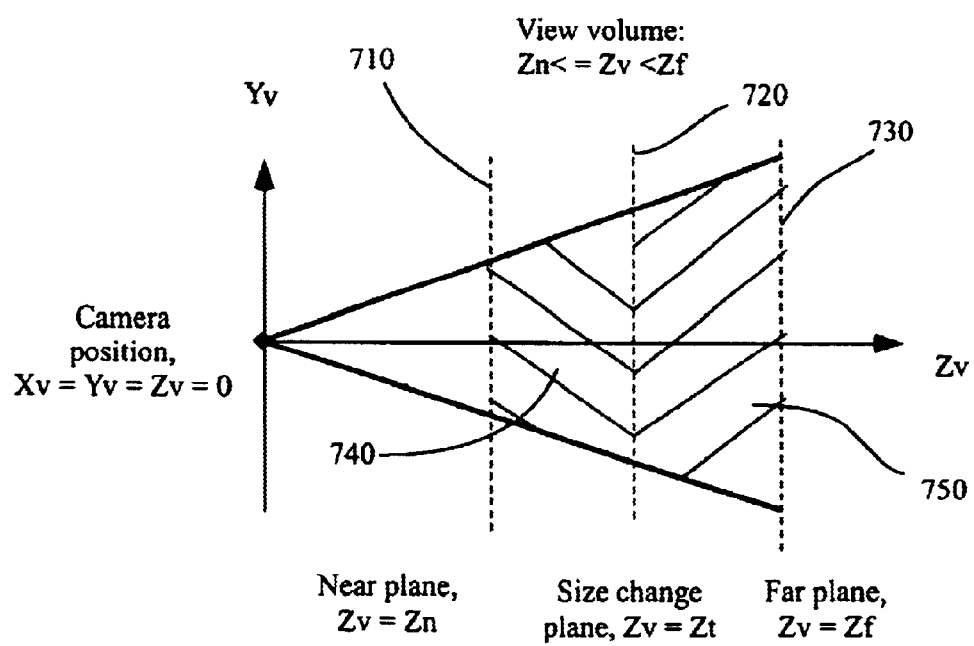
FIG. 7 illustrates the view volume between the near plane and the far plane that is split by the an intermediate plane at the threshold distance from the camera.

An advantage of the present invention is the performance improvement of the graphics rendering system that is realized mostly through saving of the bandwidth required for depth buffer access. To demonstrate these savings in more detail, FIG. 7 illustrates the view volume between the near plane 710 and the far plane 730, that is split by the plane 720 at the threshold distance from the camera. This corresponds to the point at which the precision of the 24-bit screen Z-buffer becomes equal to or less than the precision of the most significant bits of the multi-resolution depth buffer of the invention. The depth value for the distances in the region 740 is read and the per-pixel depth value is stored (using the full storage size (in bits)), while the depth values for the distances in the region 750 are read and stored using only the most significant bits of the depth values. Assuming that primitives composing the scene are distributed with uniform density throughout the view volume, the number of surface pixels to be tested in the region 750 is smaller than the number of surface pixels in the whole view volume pyramid according to the equation:

$$F = \frac{Z_f^3 - Z_t^3}{Z_f^3 - Z_n^3}$$

Figure 8:
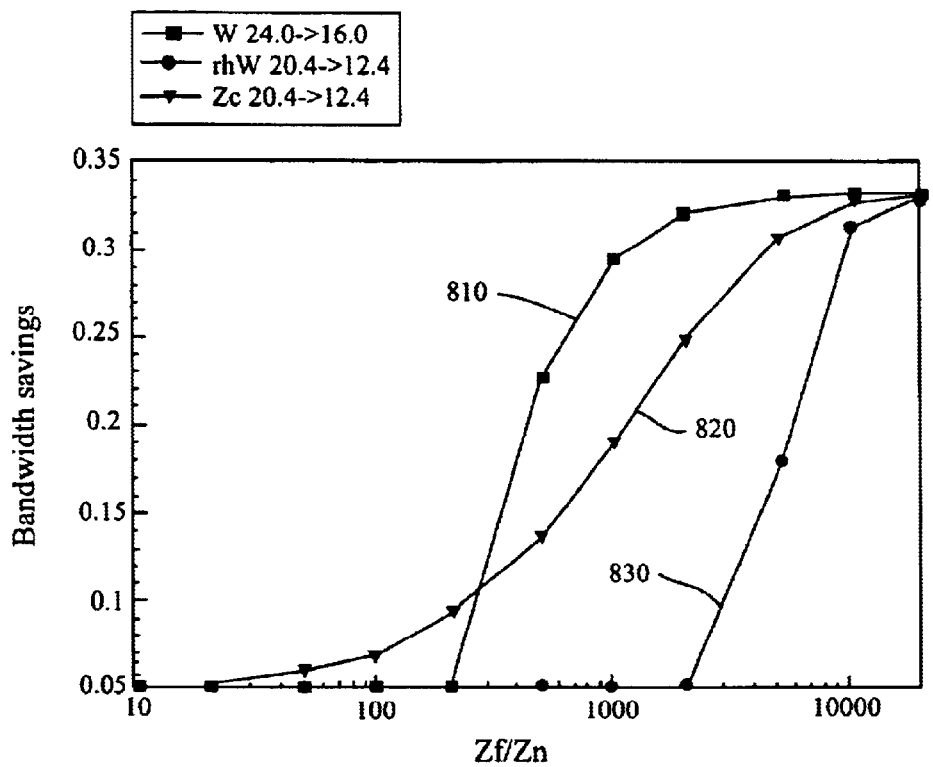
FIG. 8 illustrates the results of computing the bandwidth savings for a given threshold distance for a W-buffer, a complementary Z-buffer, and an rh W-buffer.

For a 24-bit depth buffer depth value entry of the most significant 16 bits, each read and write access in the region 750 uses, for example, 33% less bandwidth than similar accesses in the region 740. To compute bandwidth savings for a given threshold distance, the maximum saving is multiplied by the factor F from the above equation. FIG. 8 illustrates the results of this computation for a W-buffer (data set 810), a complementary Z-buffer (data set 820), and an rh W-buffer (data set 830). For instance, for the complementary Z-buffer, bandwidth savings exceed 16% for $Z_f/Z_n$ ratios above 1,000. For W-buffers at the same ratio, bandwidth savings exceed 28%.

These savings are realized if the most significant bits and the least significant bits of the depth buffer are stored separately from each other, for example, in contiguous blocks exceeding the minimal size of the data access through the memory bus. For instance, if the width of the data bus is 128 bits, bandwidth savings may be realized when the most significant 16-bits of the depth values for 8 pixels (for instance in a 4×4 tile) are stored separately from the less significant 8-bits of the depth values.

Even if the most significant bits of the depth values are stored together with the least significant bits, the multi-resolution depth buffer of the invention still has an advantage over the fixed-size depth buffer because it keeps the least significant bits of the large depth values intact during the rendering of the scene. This data can be used to carry additional information, such as an object ID number, in order to assist in collision detection or picking operations. Usually, these operations are performed after rendering object IDs into separate buffers for the whole view volume. With the multi-resolution depth buffer of the invention, a separate object ID buffer renders primitives closer than the threshold distance from the camera (for instance, by inserting a clipping plane at $Z_t=Z_v$), while other object IDs are stored during rendering of the main depth buffer.

Figure 9A:
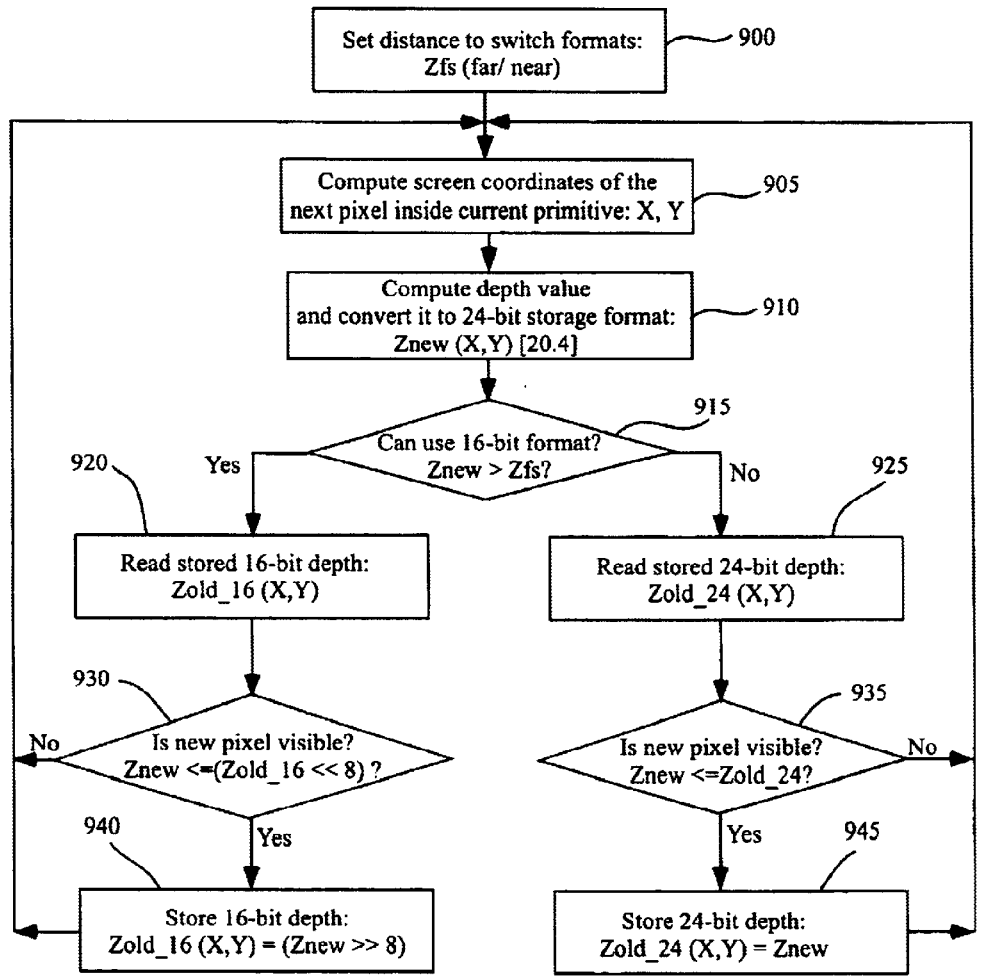
FIG. 9A demonstrates a sequence of operations used during depth buffer access when the size of the depth buffer access depends on the comparison of the computed depth value with a pre-defined threshold.
Figure 9B:
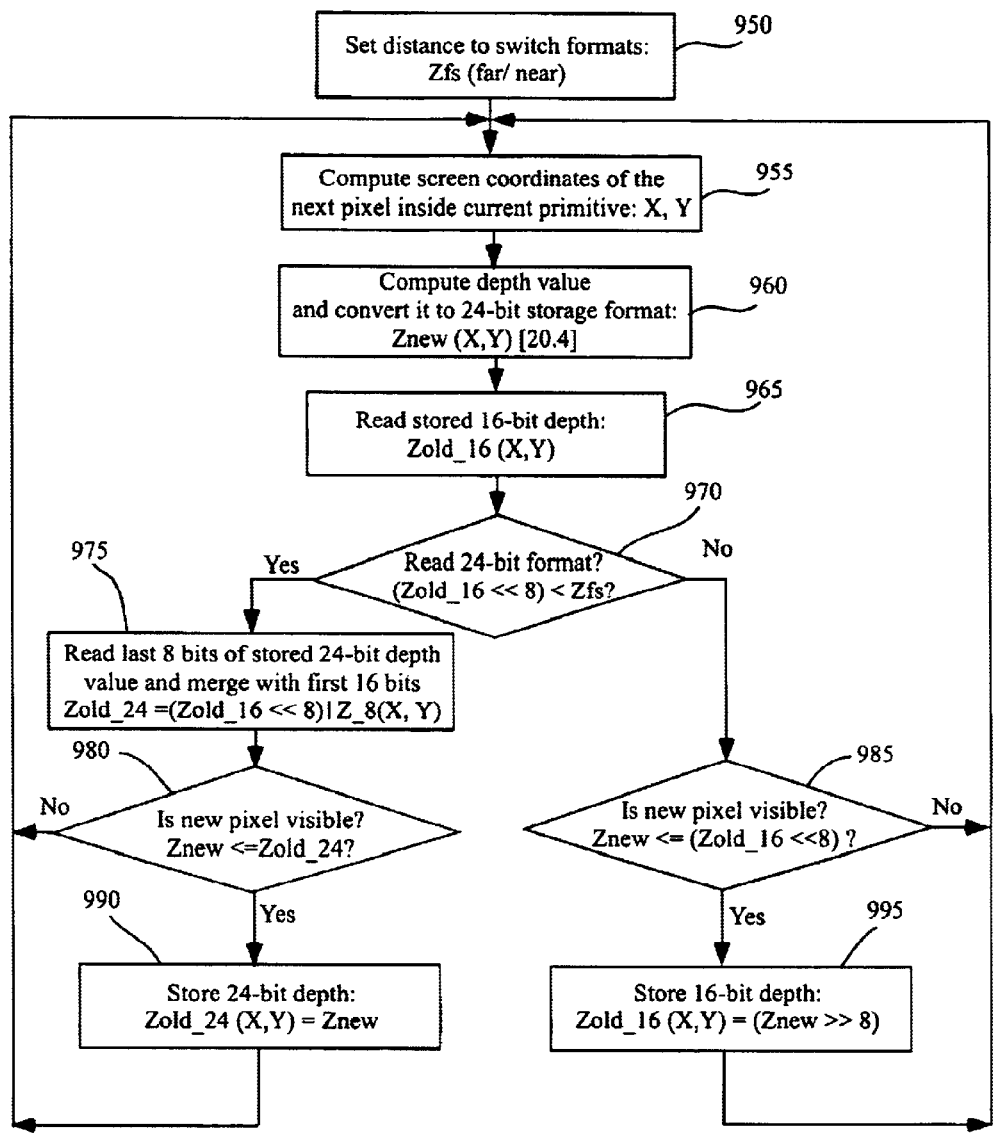
FIG. 9B demonstrates a sequence of operations used during depth buffer access where the size of the depth buffer access depends on the comparison of the most significant bits of the stored depth value with the pre-defined threshold.

FIGS. 9A and 9B illustrate a sequence of operations used during depth buffer access in accordance with alternative embodiments of the invention. FIG. 9A demonstrates a sequence of operations used during depth buffer access when the size of the depth buffer access depends on the comparison of the computed depth value with a pre-defined threshold. Its value $Z_{fs}$ is computed at the step 900 by mapping the threshold distance $Z_t$ to the screen space using a mapping function and storage representation for the given depth buffer (for instance, a W-buffer). Next, for each pixel of the current primitive, its coordinates are computed at step 905 and the depth value for the pixel is computed and converted to the given storage format (step 910). If the new Z value is larger than the threshold (a comparison operation performed at step 915), the depth buffer access and the visibility test are performed for the 16 most significant bits of the depth values (steps 920, 930, 940). Otherwise, they are performed for the complete 24-bit depth value (steps 925, 935, 945). It should be noted, however, that the type of comparison used at step 915 depends on the mapping function between the distance from the camera and the depth value in the screen space.

During the visibility test at step 930, the 16 most significant bits of the old Z value is compared with the new depth value. To align the data before the comparison, preferably the 16-bit old Z value is shifted left by 8 (i.e., setting the low 8 bits to zero). According to the present invention, a smaller data access can be used for the distances from the camera exceeding the threshold value. If the screen space depth values increase with an increase of the distance from the camera (for instance, in a W-buffer), the 16-bit path can be used when $Z_{new}>Z_{fs}$ (as shown in block 915). However, if the screen space depth values decrease with an increase of the distance from the camera (for instance, in a complementary Z-buffer or in a rh W-buffer), the 16-bit path can be used when $Z_{new}<Z_{fs}$.

FIG. 9B demonstrates a sequence of operations used during depth buffer access where the size of the depth buffer access depends on the comparison of the most significant bits of the stored depth value with the pre-defined threshold. The threshold value is computed at step 950. After coordinates of the current pixel, or a pixel block are found (step 955), the process of computing new depth values begins (step 960), and the 16 most significant bits of the depth value are read from storage (step 965). If this portion, shifted by 8, as described above, is less than the threshold $Z_{fs}$ (a comparison performed at step 970), the less significant 8-bits are read from storage (step 975), and, if the result of the visibility test (performed at step 980) is successful, the new 24-bit depth value is written into the frame buffer (step 990). If the comparison at step 970 returns a negative result, the less significant 8-bits of the old depth values are replaced by 0s for the visibility test (step 985), and, if the pixel is visible, only the most significant 16-bits are written into the frame buffer.

The data flow shown in FIG. 9B may provide performance improvement over the data flow shown in FIG. 9A, if the time required to compute the new depth value is significantly larger than the time to access the memory. For instance, for a graphics accelerator with an embedded memory, where a small number of logic gates are tightly coupled with a fast memory, the computation of depth values can start immediately after the coordinates of the current pixel are known, but need only be available after a full or partial depth value is read from storage (in time for the visibility test at step 980 or 985).

Figure 10:
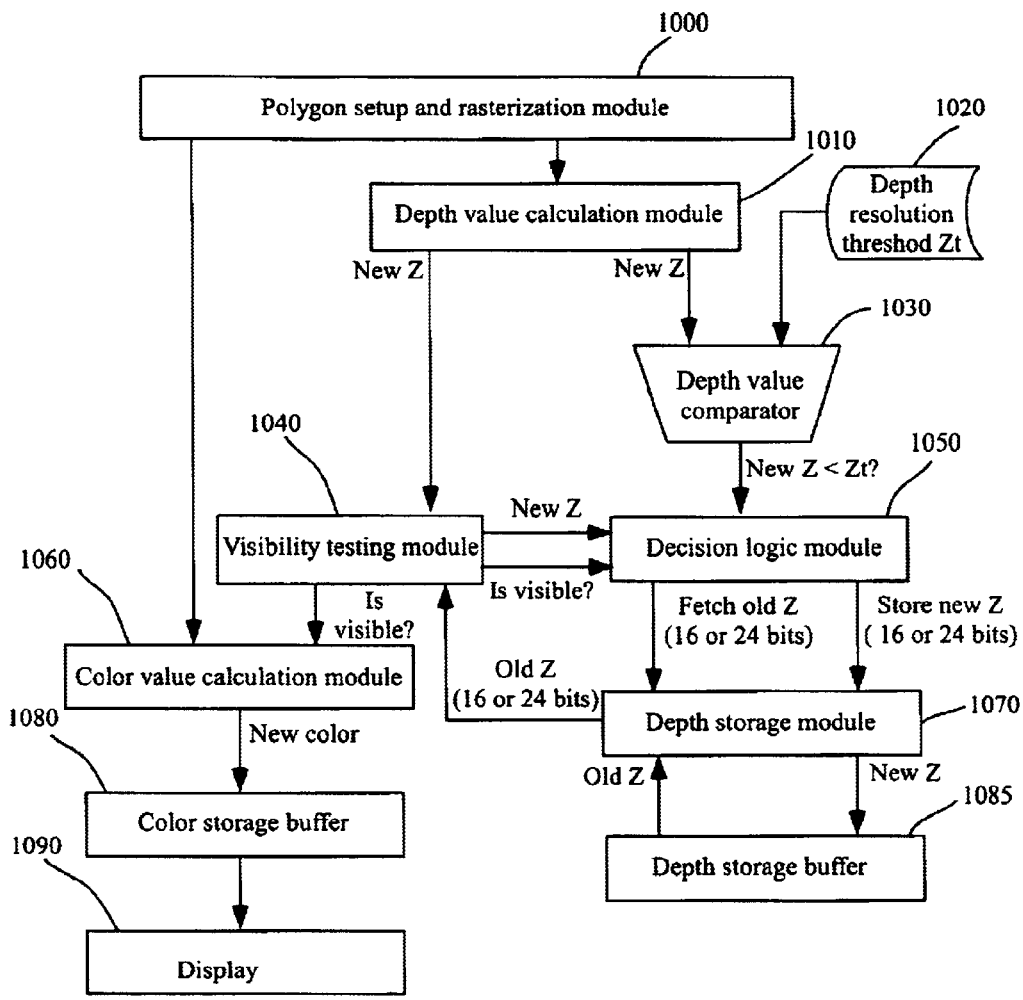
FIG. 10 shows a block diagram of a graphics subsystem in a computer system that is designed in accordance with the invention.

FIG. 10 shows a block diagram of the graphics subsystem in a computer system that is designed in accordance with the invention. Per-vertex data, containing screen space coordinates, colors, texture coordinates, etc., are processed by the polygon setup and rasterization module 1000 to prepare for pre-pixel computations. Per-pixel depth values are computed by the depth value calculation module 1010. Depth value comparator 1030 compares this new value with stored depth resolution threshold $Z_{fs}$ (stored in the storage 1020), and transmits the comparison result to the decision logic module 1050.

Based on the comparison results, the decision logic module 1050 issues a request to the depth storage module 1070 to fetch an old depth value for the given pixel, reading the 16 most significant bits, or the 24-bit value. Depth values are read from the depth storage buffer 1085 and sent to the visibility testing module 1040, which also receives a new depth value from the depth calculation module 1010. The visibility testing module 1040 compares the new and the old depth values (replacing the less significant 8 bits with 0s, if only the most significant 16 bits of the old value are available), and, if the new pixel is visible, sends the new depth value to the decision logic module 1050. Based on the results received from the depth value comparator 1030, the decision logic module 1050 requests the depth storage module 1070 to write either a 16-bit or 24-bit depth value to the depth storage buffer 1085. The visibility testing module 1040 also sends test results to the color calculation module 1060 which computes per-pixel color values. If the new pixel is visible, the new color data is sent to the color storage buffer 1080 and the results are rendered on the computer screen by the display module 1090.

The graphics subsystem shown in FIG. 10 performs operations corresponding to the data flow illustrated in FIG. 9A. Operations corresponding to the data flow illustrated in FIG. 9B can be performed by the subsystem where the depth value comparator 1030 is used to compare the most significant portion of the stored depth value with a pre-defined threshold and, based on the results of this comparison, decision logic module 1050 either requests to read the least significant portion of the depth value, or not. Storage of the new depth value is performed as similarly described above.

What is claimed is:

1. A method for identifying whether a given primitive is visible by a camera in a view volume at a pixel P corresponding to an area on the surface of a given primitive, comprising the steps of:

storing a first depth value that is associated with the pixel P in a buffer, the first depth value including a first portion including the most significant bits of the first depth value and a second portion including the least significant bits of the first depth value;

computing a second depth value that is associated with the pixel P, the second depth value including a third portion including the most significant bits of the second depth value and a fourth portion including the least significant bits of the second depth value;

comparing the second depth value with a value corresponding to a threshold distance from the camera;

retrieving at least the most significant bits of the first depth value;

comparing the retrieved bits with the second depth value to determine if the pixel P is visible; and if the pixel P is visible and is closer to the camera than the threshold distance, replacing the first depth value with the second depth value;

if the pixel P is visible and is further from the camera than the threshold distance, replacing the first portion of the first depth value with the third portion of the second depth value while leaving the second portion of the first depth value unchanged.

2. The method of claim 1, wherein if the pixel P is closer to the camera than the threshold distance, the step of retrieving includes retrieving the first and second portions of the first depth value, and wherein if the pixel P is further from the camera than the threshold distance, the step of retrieving includes retrieving only the first portion of the first depth value.

3. The method of claim 2, wherein if the pixel P is closer to the camera than the threshold distance, the second portion of the first depth value is retrieved before comparing the retrieved bits with the second depth value.

4. The method of claim 1, wherein the second depth value is computed in accordance with a function of the distance from a camera $Zv$ and wherein the second depth value is stored in accordance with a predefined storage format, wherein the threshold distance from the camera $Zt$ is equal to the distance to a plane in the view volume located between near and far planes at corresponding distances $Zn$ and $Zf$.

5. The method of claim 4, wherein for a pixel P further from the camera than the threshold distance, the error in defining $Z_v$ while using the third portion of the second depth value is equal to or less than the error in defining $Z_v$ while using the third and fourth portions of the second depth value if the second depth value is computed using the function $Z=Zf/(Zf-Zn)*(1-Zn/Zv)$.

6. The method of claim 4, wherein the function is a linear dependency between the second depth value and the distance to the camera, and wherein the predefined storage format is an integer format.

7. The method of claim 6, wherein the error in defining $Zv$ at any distance of the view volume using the third and fourth portions of the second depth value is less than or equal to the maximum of the error in defining $Zv$ using the third and fourth portions of the second depth value calculated in accordance with either the function $Z=Zf/(Zf-Zn)*(1-Zn/Zv)$ or the function $Z=Zv/Zf$.

8. The method of claim 4, wherein the predefined storage format is a floating-point format including an exponent and a mantissa, and wherein the third portion of the second depth value includes the exponent and a fifth portion corresponding to the most significant bits of the mantissa, and wherein the fourth portion of the second depth value includes a sixth portion corresponding to the least significant bits of the mantissa.

9. The method of claim 8, wherein the function generates depth values that decrease as the distance to the camera increases.

10. The method of claim 4, wherein the second depth value is scaled by a bit size corresponding to a maximum bit size that can be stored in the buffer.

11. The method of claim 1, wherein the size of the third portion of the second depth value is 16 bits, wherein the size of the fourth portion of the second depth value is 8 bits.

12. The method of claim 1, wherein the step of comparing the second depth value with the value corresponding to the threshold distance to the camera is performed only if the ratio of the distances to the far and near planes $Zf/Zn$ is larger than a predetermined value.

13. The method of claim 12, wherein the predetermined value is greater than or equal to 100.

14. A method for identifying whether a given primitive is visible by a camera in a view volume at a pixel P corresponding to an area on a surface of a given primitive, comprising the steps of:

storing a first depth value that is associated with the pixel P in a buffer, the first depth value including a first portion including the most significant bits of the first depth value and a second portion including the least significant bits of the first depth value;

retrieving a first set of bits corresponding to the first portion of the first depth value;

comparing the retrieved bits with a value corresponding to a threshold distance from the camera;

computing a second depth value that is associated with the pixel P, the second depth value including a third portion including the most significant bits of the second depth value and a fourth portion including the least significant bits of the second depth value; and if the retrieved first set of bits correspond to the distance to the camera that is closer than the threshold distance, retrieving a second set of bits corresponding to the second portion of the first depth value and comparing the second depth value with the first depth value to determine if the pixel P is visible;

if the retrieved first set of bits correspond to a distance to the camera that is further than the threshold distance, comparing the second depth value with the first portion of the first depth value to determine if the pixel P is visible; and if the pixel P is visible, (a) replace the first depth value with the second depth value if the pixel P is closer to the camera than the threshold distance; or (b) replace the first portion of the first depth value with the third portion of the second depth value while leaving the second portion of the first depth value unchanged if the pixel P is visible and is further from the camera than the threshold distance.

15. The method of claim 14, wherein the second depth value is computed in accordance with a function of the distance from a camera $Zv$ and wherein the second depth value is stored in accordance with a predefined storage format, wherein the threshold distance from the camera $Zt$ is equal to a distance to a plane in the view volume that is located between near and far planes at corresponding distances $Zn$ and $Zf$.

16. The method of claim 15, wherein for a pixel P that is further from the camera than a threshold distance, the error in defining Zv while using the third portion of the second depth value is equal to or less than the error in defining Zv while using the third and fourth portions of the second depth value if the second depth value is computed using the function $Z=Zf/(Zf-Zn)*(1-Zn/Zv)$.

17. The method of claim 15, wherein the function is a linear dependency between the second depth value and the distance to the camera, and wherein the predefined storage format is an integer format.

18. The method of claim 15, wherein the predefined storage format is a floating-point format including an exponent and a mantissa, and wherein the third portion of the second depth value includes the exponent and a fifth portion corresponding to the most significant bits of the mantissa, and wherein the fourth portion of the second depth value includes a sixth portion corresponding to the least significant bits of the mantissa.

19. The method of claim 14, wherein the size of the third portion of the second depth value is 16 bits, wherein the size of the fourth portion of the second depth value is 8 bits.

20. The method of claim 14, wherein the step of comparing the second depth value with the value corresponding to the threshold distance to the camera is performed only if the ratio of the distances to the far and near planes Zf/Zn is larger than a predetermined value.

21. The method of claim 20, wherein the predetermined value is greater than or equal to 100.

22. An apparatus for evaluating the depth of a pixel P in a scene, the scene being enclosed in a view volume defined by a near and a far plane, and rendered from a camera position, comprising:

a depth storage module configured to store a first depth value for a pixel P in a buffer, the first depth value having a first portion corresponding to the most significant bits of the first depth value and a second portion corresponding to the least significant bits of the first depth value;

a depth value calculation module configured to calculate a second depth value for the pixel P, the second depth value having a third portion corresponding to the most significant bits of the second depth value and a fourth portion corresponding to the least significant bits of the second depth value;

a comparator that compares the second depth value with a value corresponding to a threshold distance from the camera;

a visibility testing module that compares the most significant bits of the first depth value with the second depth value to determine if the pixel P is visible;

a decision logic module that causes the depth storage module to:

(a) replace the first depth value with the second depth value if the pixel P is visible and closer to the camera than the threshold distance, or (b) replace the first portion of the first depth value with the third portion of the second depth value while leaving the second portion of the first depth value unchanged if the pixel P is visible and is further from the camera than the threshold distance.

23. The apparatus of claim 22, wherein the decision logic module causes the depth storage module to perform one the additional functions: fetching the first depth value from the buffer and sending it to the visibility testing module if the pixel P is closer to the camera than the threshold distance, or fetching only the first portion of the first depth value from the buffer and sending it to the visibility testing module if the pixel P is further from the camera than the threshold distance.

24. A The apparatus of claim 22, wherein the threshold distance from the camera Zt is a distance to a plane in the view volume that is located between near and far planes and corresponding distances Zn and Zf, and for any pixel P that is further from the camera than the threshold distance, the error in defining Zv while using the third portion of the second depth value is equal to or less than the error in defining Zv while using the third and fourth portions of the second depth value if the second depth value is computed using the function $Z=Zf/(Zf-Zn)*(1-Zn/Zv)$.

25. The apparatus of claim 22, wherein the depth storage module is configured to store depth values in an integer format, and wherein the depth value calculation module utilizes a depth function in accordance with a linear dependency between a stored depth value and the distance to the camera.

26. The apparatus of claim 22, wherein the second depth value is stored in accordance with a predefined storage format including an exponent and a mantissa, and wherein the third portion of the second depth value includes the exponent and a fifth portion corresponding to the most significant bits of the mantissa, and wherein the fourth portion of the second depth value includes a sixth portion corresponding to the least significant bits of the mantissa.

27. The apparatus of claim 22, wherein size of the third portion of the second depth value is 16 bits, and wherein the size of the fourth portion of the second value depth value is 8 bits.

28. The apparatus of claim 22, wherein the comparator is configured to compare the second depth value with the value corresponding to the threshold distance to the camera only if the ratio of the distances to the far and near planes Zf/Zn is larger than a predetermined value.

29. The apparatus of claim 28, wherein the predetermined value is greater than or equal to 100.

* * * * *